United States Patent [19]
Wier

[11] Patent Number: 5,936,186
[45] Date of Patent: Aug. 10, 1999

[54] ELECTRICAL IGNITER OF A PYROTECHNICAL GAS GENERATOR

[75] Inventor: Franz Wier, Göggingen, Germany

[73] Assignee: TRW Occupant Restraint Systems GmbH, Alfdorf, Germany

[21] Appl. No.: 08/851,787

[22] Filed: May 6, 1997

[30] Foreign Application Priority Data

May 6, 1996 [DE] Germany ............ 296 08 194 U

[51] Int. Cl.⁶ .................................................. B60R 22/46
[52] U.S. Cl. ................... 102/202.14; 180/268; 280/806
[58] Field of Search .................. 102/202, 202.5, 102/202.7, 202.9, 202.11, 202.12, 202.14, 217, 275.11, 318, 275.6; 280/806, 735, 801.1, 736, 741; 180/282, 268

[56] References Cited

U.S. PATENT DOCUMENTS

| | | | |
|---|---|---|---|
| 1,516,009 | 11/1924 | Grant et al. .......................... | 102/318 |
| 2,934,014 | 4/1960 | Smith et al. .......................... | 102/202 |
| 3,567,190 | 3/1971 | Cassidy et al. ....................... | 60/256 |
| 3,917,031 | 11/1975 | Doin et al. . | |
| 4,337,702 | 7/1982 | Betts .................................... | 102/254 |
| 4,690,063 | 9/1987 | Granier et al. . | |
| 4,751,881 | 6/1988 | Fauconnier et al. ................. | 102/202 |
| 5,024,158 | 6/1991 | Kennedy et al. ................. | 102/275.11 |
| 5,301,772 | 4/1994 | Honda ................................. | 180/268 |
| 5,415,431 | 5/1995 | Omura ................................. | 280/805 |
| 5,553,890 | 9/1996 | Buhr et al. .......................... | 280/806 |
| 5,605,202 | 2/1997 | Dixon ................................. | 180/268 |
| 5,626,359 | 5/1997 | Steffens, Jr. et al. ............... | 280/735 |
| 5,662,353 | 9/1997 | Bergerson et al. ................. | 280/37 |

FOREIGN PATENT DOCUMENTS

| | | |
|---|---|---|
| 50-42523 | 8/1975 | Japan . |
| 58-105766 | 6/1983 | Japan . |
| 61-68384 | 4/1986 | Japan . |
| 248464 | 4/1990 | Japan . |
| 5220380 | 8/1993 | Japan . |

Primary Examiner—Charles T. Jordan
Assistant Examiner—Christopher K. Montgomery
Attorney, Agent, or Firm—Tarolli, Sundheim, Covell Tummino & Szabo

[57] ABSTRACT

An electrical igniter of a pyrotechnical gas generator including a propelling charge has a housing of its own in which pyrotechnical ignition material including an electrical ignition element and a cable end connected thereto are enclosed so that electrical plug contacts may be avoided.

10 Claims, 3 Drawing Sheets

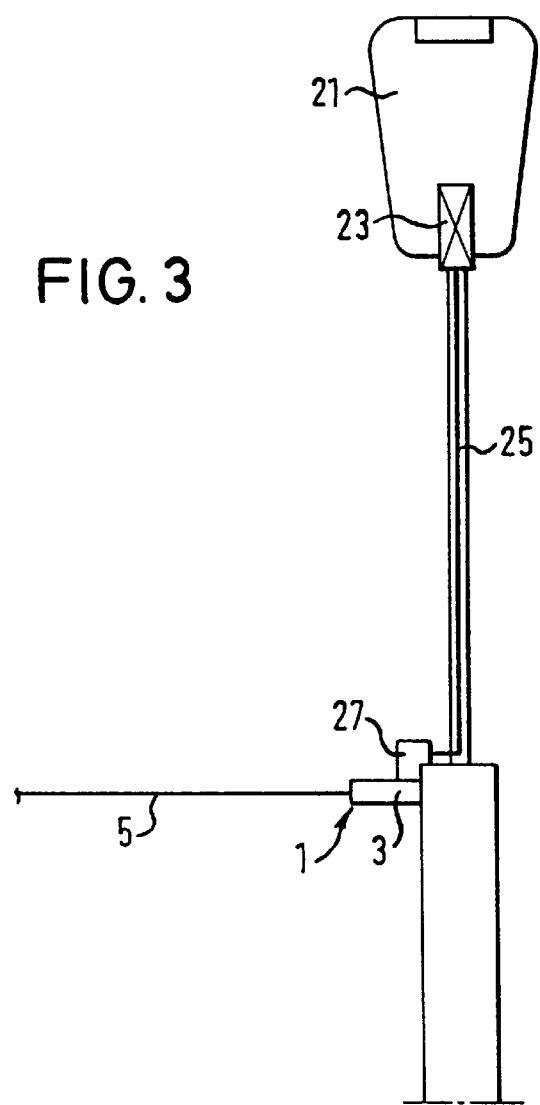
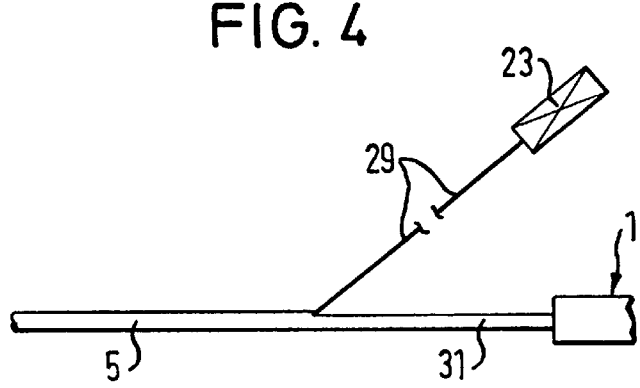

ELECTRICAL IGNITER OF A PYROTECHNICAL GAS GENERATOR

TECHNICAL FIELD

The invention relates to an electrical igniter for a pyrotechnical gas generator, a gas generator having such igniter and a belt pretensioner having such gas generator.

BACKGROUND OF THE INVENTION

An electrical igniter of a pyrotechnical gas generator for a belt pretensioner is known, for example, from EP 0 547 443 A1. This igniter comprises an ignition resistor protruding into a space filled with a pyrotechnical propellant. The ignition resistor is connected to contact pins projecting outwardly from the housing of the gas generator, these contact pins enabling mounting of a corresponding plug to which a cable can be attached which connects the igniter to an activator determining activation timing of the ignition. The electrical plug needs to be extremely reliable in contact and thus resistant to corrosion so that even after years of vehicle driving a reliable activation is assured in case of a collision. It is for this reason that the contact pins and the corresponding mating parts are partly gold or platinum plated which makes them relatively expensive. On top of this, the plug needs to be configured so that it will not detach despite vibration and that it can be safely fitted.

In addition to this, pyrotechnical gas generators are known which feature a propelling charge having a propelling charge housing to which the cable is non-releasably secured. The cable is connected to an ignition resistor located in the interior of the propelling charge housing, the pyrotechnical propellant adjoining the former so that upon a corresponding electrical signal the propellant can be ignited directly by the ignition resistor. This known gas generator has the disadvantage, however, that in the non-fitted condition the corresponding contact wires for activating the propellant need to be short-circuited to prevent an accidental ignition, e.g. during transportation, and a displacement of the piston which makes the complete gas generator useless.

BRIEF SUMMARY OF THE INVENTION

By the invention an electrical igniter is defined which eliminates complicated means to prevent corrosion or detachment of the electrical connection whilst nevertheless assuring high reliability that the igniter is always in electrical contact with the cable. The electrical igniter according to the invention which is for a pyrotechnical gas generator actuatable by a propelling charge, has an igniter housing of its own, the igniter containing pyrotechnical ignition material, an electrical ignition element and a cable end connected to said ignition element. The electrical igniter according to the invention is directly attached to the cable so that the connector as usual hitherto is eliminated.

According to a preferred embodiment the housing of the igniter contains the pyrotechnical ignition material as well as the propelling charge which is arranged adjacent thereto. Since the igniter and the ignition material are, however, arranged in the same housing outside the cylinder, only one component is provided containing pyrotechnical material which reduces the total costs for storage and transportation, because frequently special requirements have to be met in the case of stocking and transporting pyrotechnical material.

The invention further provides a pyrotechnical gas generator for a vehicle occupant restraint system, comprising a propelling charge and a propelling charge housing with an opening. The gas generator further comprises an electrical igniter having an igniter housing of its own. The igniter housing contains pyrotechnical ignition material, an electrical ignition element, a cable end connected to the ignition element and an opening. The housing of said igniter may be shipped separate from the propelling charge, but may be secured to the propelling charge housing in such a way that the propellant is ignitable through the openings in the igniter housing and in the propelling charge housing arranged opposite to each other.

With this gas generator, the risk of an accidental actuation of the gas generator during transportation is excluded. The igniter and the propelling charge form separate units which do not need to be joined together until being fitted in the vehicle. The gas generator according to the invention is e.g. applicable both in the case of a belt pretensioner and in the case of a gas bag.

The invention also provides a belt pretensioner including a piston, a cylinder with an opening and a pyrotechnical gas generator having a propelling charge and a propelling charge housing having an opening, the gas generator being arranged within the cylinder. The pretensioner further comprises an electrical igniter having an igniter housing of its own. The igniter housing contains pyrotechnical ignition material, an electrical ignition element and a cable end connected to the ignition element. The housing of the igniter has an opening and may be shipped separate from the propelling charge, but may be secured to the cylinder in such a way that the propellant is ignitable through the openings in the igniter housing and in the cylinder. As a result of the propellant material being arranged outside the piston and only flowing into the working space upon ignition, a less abrupt acceleration of the piston results reducing the load of the components. In this embodiment the propelling charge may be installed highly space-saving in the vehicle which may be further enhanced by the propelling charge being configured in the shape of a circular ring and the wall of the cylinder forming at least in part the propelling charge housing.

According to another embodiment, the belt pretensioner has a piston, a cylinder with an opening and a pyrotechnical gas generator having a propelling charge and a propelling charge housing. The generator further comprises an electrical igniter having an igniter housing of its own. The igniter housing contains pyrotechnical ignition material, an electrical ignition element, a cable end connected to the ignition element and the propelling charge which is arranged adjacent to the ignition material. The igniter housing has an opening and may be shipped separate from the propelling charge, but may be secured to the cylinder in such a way that generated gas flows through the openings in the igniter housing and in the cylinder into the cylinder.

In accordance with a preferred embodiment of the igniter according to the invention, the cable end is poured out in a passage opening through the igniter housing so that it is also protected against moisture ingress in the region of the cable fastener.

Facilitated fitting of the igniter to the propelling charge housing is achieved in that on the housing of the igniter at least a part of a connector is molded as the fastening means, the igniter being able to be attached to the propelling charge housing by means of the connector. Since the connector represents no electrical connection between igniter and propelling charge housing, propelling charge and igniter can be simply first connected together with no electrical contact problem when fitted in the vehicle.

A preferred connector between igniter and propelling charge housing consists of a fastener ring being molded to the housing of the igniter as a fastener means which serves as a connector and which can be attached to a cylindrical propelling charge housing.

In accordance with a preferred embodiment, at least one electrical plug contact connected to the cable is molded to the housing of the igniter, by means of which at least one further sensor and/or at least one switch can be connected to the cable via a latchable mating connector. This serves the purpose of needing to route as few separate leads in the vehicle as possible so that, for example, a belt buckle sensor or a switch provided in the vicinity of the igniter can be connected to the cable. Accordingly, other sensors responsible for activating the ignition may be connected very simply or other safety systems activated by corresponding switches in the vehicle in case of a collision.

An alternative aspect in this respect provides for the cable being configured as a multi-core cable, of which a few cores are branched off to at least one further sensor and/or at least one switch prior to the housing, thus enabling further plug contacts to be avoided.

In accordance with a preferred embodiment of the gas generator according to the invention, the propelling charge housing is cylindrical and the housing of the igniter features a correspondingly concave housing section having a fastener ring attached thereto so that a receiving opening materializes through which the igniter housing can be releasably mounted on the propelling charge housing. The concave housing section creates a gas-tight connection of the interior of the igniter housing to the interior of the propelling charge housing since it adjoins the propelling charge housing over a large surface.

BRIEF DESCRIPTION OF THE DRAWINGS

FIG. 3 shows a second embodiment of the electrical igniter in accordance with the invention which is configured with an electrical connector to which a belt buckle switch is connected, and FIG. 4 shows a third embodiment of the electrical igniter according to the invention.

DETAILED DESCRIPTION OF PREFERRED EMBODIMENTS

Figure 1:
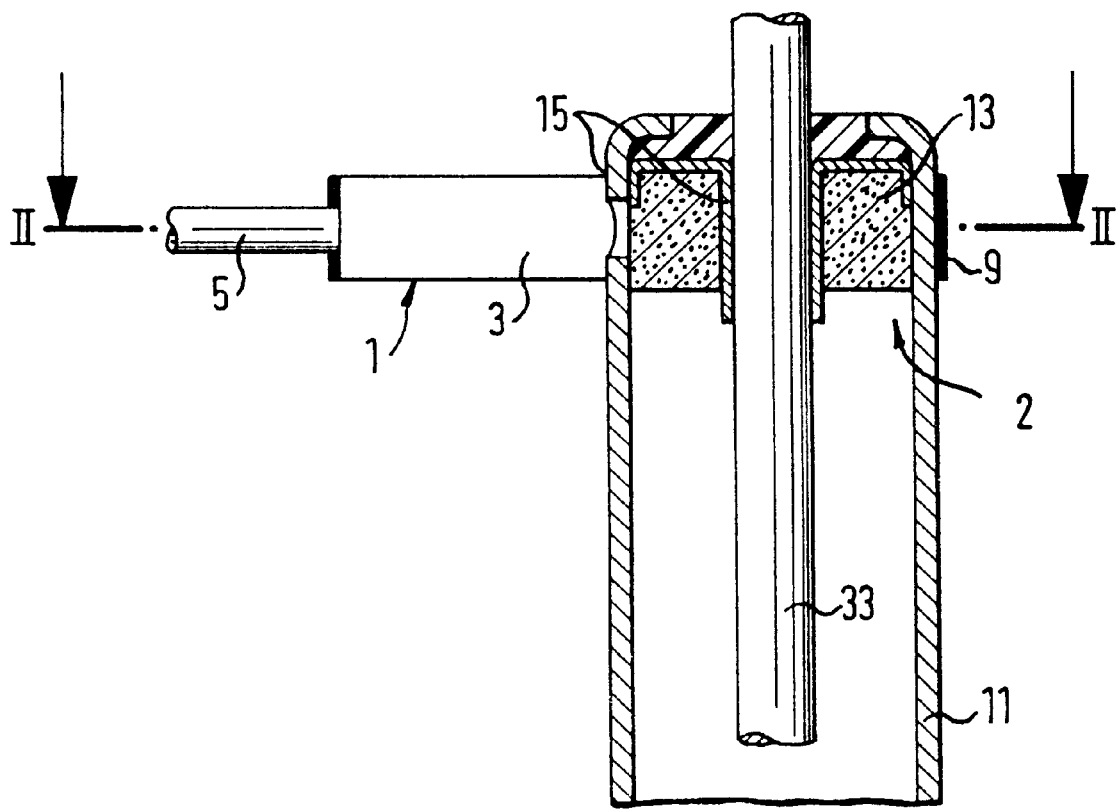
FIG. 1 is a longitudinal section through a cylinder of a belt tensioner according to the invention comprising a gas generator in accordance with the invention including a propelling charge and an electrical igniter according to the invention arrested at the cylinder.
Figure 2:
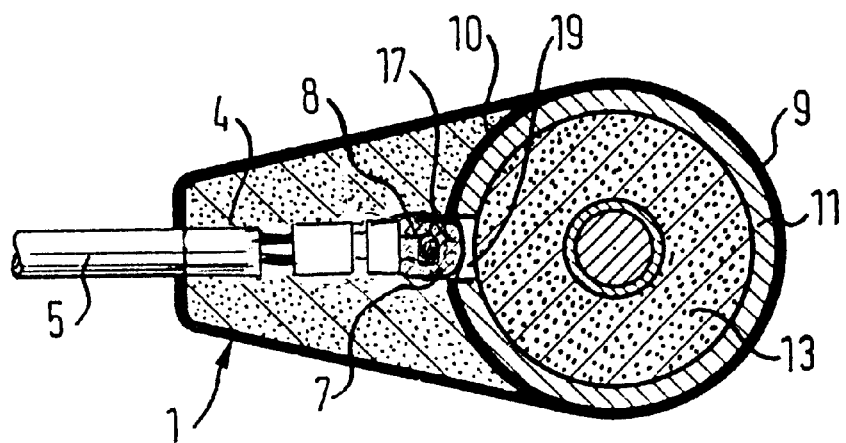
FIG. 2 is a section view along the line II—II in FIG. 1.

In FIG. 1 a gas generator is shown which is part of a belt tensioner. The gas generator comprises an electrical igniter 1 and a propelling charge 2. The electrical igniter 1 features a igniter housing 3 having a passage (not shown) in which the end 4 of a multi-core cable 5 is poured out, producing an electrical connection of the igniter 1 to an activator (not shown). In the interior of the igniter housing 3 a pyrotechnical ignition material 7 surrounded by a sealing compound 6 is provided which can be ignited by an ignition element, also provided therein, in the form of an ignition resistor 8 connected to the cable end 4 as soon as the activator furnishes a corresponding signal. The housing 3 of the igniter 1 comprises a fastener ring 9 molded to a concave housing section 10. By means of the resulting receiving opening the igniter 1 configured as a separate unit is secured to a cylinder 11 of a piston/cylinder unit of the belt tensioner. At the upper end of the cylinder 11, in the interior thereof the circular ring-shaped propelling charge 2 is arranged, the cylinder 11 forming in this region also a part of the propelling charge housing 15. The igniter 1 is inserted through the fastener ring 9 from above onto the cylinder 11 until one opening 17 in the housing 3 of the igniter 1 coincides with an opening 19 in the cylinder 11. The igniter 1 shown in the FIGS. 1 and 2 may, for example, again be removed from the propelling charge housing 15 following a collision, so that the cylinder 11 together with the propelling charge 2 arranged thereon can be replaced new.

The igniter 1 shown excels by its high functional reliability since the ignition resistor 8 is not connected via an electrical connector to the cable 5.

If further sensors or switches are arranged in the vicinity of the igniter 1 which in case of a collision receive or emit electrical signals, the igniter 1 may be connected to further sensors or also switches as is shown in FIGS. 3 and 4. In FIG. 3 a belt buckle switch 23 applied to a belt buckle 21 for sensing seat occupancy is connected to the igniter 1 via an electrical lead 25. The housing 3 of the igniter 1 has for this purpose on its outside electrical plug contacts (not shown) to which the lead 25 is connectable via a mating plug 27. In this arrangement the plug contacts may be connected via corresponding leads in the interior of the igniter 1 to other cores of the cable 5 as signal leads for activating the igniter 1 so that an electrical connection of the belt buckle switch 23 to e.g. the activator via the lead 25, the mating connector 27, the electrical igniter 1 and the cable 5 is provided, the activator dictating the time of activation.

If a mating connector 27 is to be avoided, the cable 5 may be split even prior to the electrical igniter 1 (cf. FIG. 1) by leading one part of the cable 29 to the belt buckle switch 23 and the other part of the cable 31 to the igniter 1.

By means of the igniters shown in FIGS. 3 and 4 it is thus very easily possible to electrically connect safety systems subsequently installed in a vehicle, such as, for instance, a belt buckle switch to other components.

In case of a collision an electrical signal is led via the cable 5 from the activator to the ignition resistor 8 in the interior of the housing 3 to ignite the ignition material 7. Through the openings 17 and 19 the propelling charge 2 is then ignited, resulting in gas being generated which actuates a piston (not shown) which is connected to the belt buckle 21 via a piston rod 33.

Figure 5:
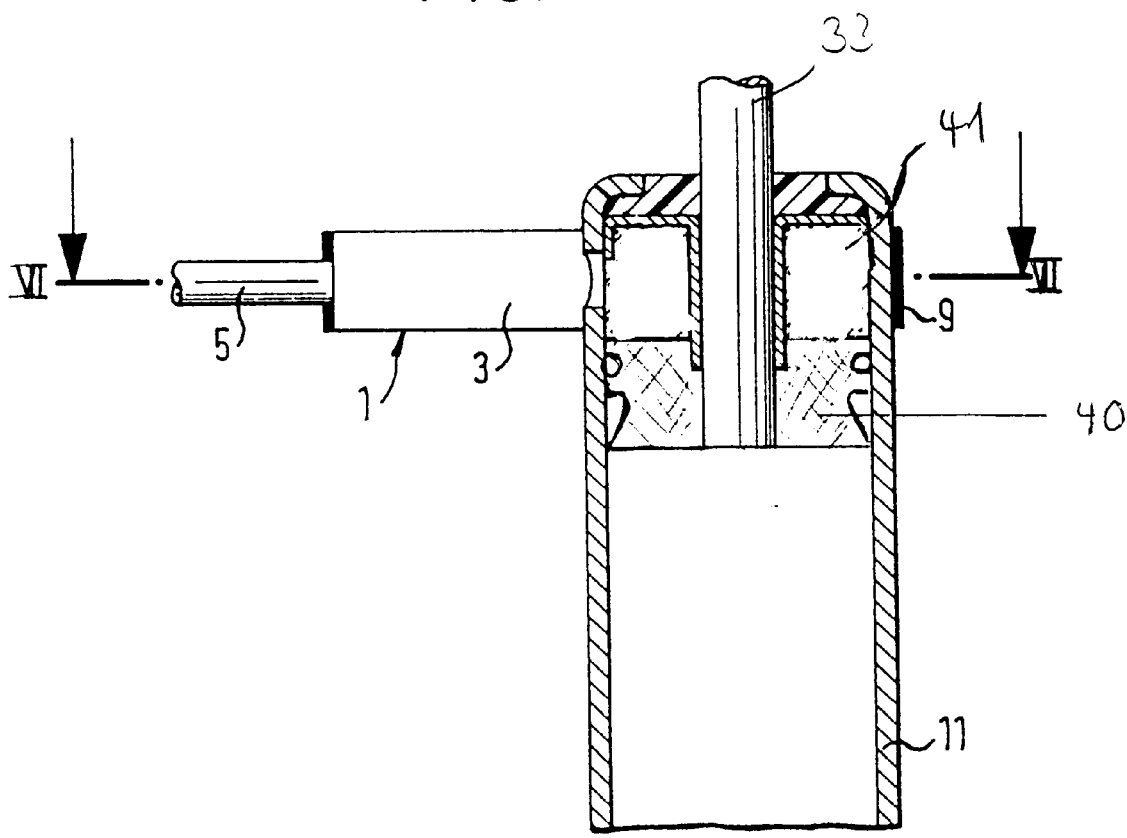
FIG. 5 depicts a longitudinal section through a cylinder of a belt tensioner with a gas generator of the invention in accordance with a further embodiment at which an electrical igniter is mounted in accordance with another embodiment.
Figure 6:
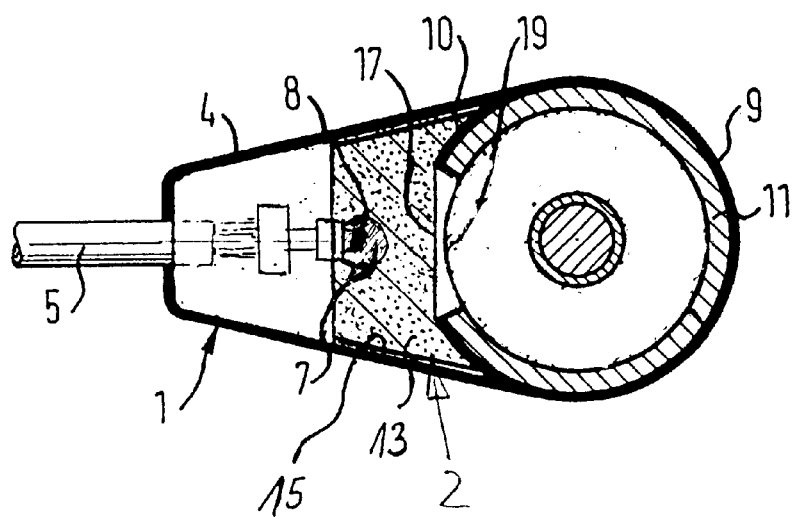
FIG. 6 is a sectional view along the line VI—VI in FIG. 5.

In the embodiment shown in FIG. 5 the propelling charge 2 is not arranged in the interior of the cylinder but outside thereof, namely in the interior of the housing 4 of the igniter 1, as depicted in FIG. 6. A hollow is provided between the piston 40 and the upper front wall of the cylinder 11, the hollow forming a working space 41. In the case of a restraint action, the gas generated in the igniter 1 outside the working space can flow into this working space 41 and actuate the piston 40. The propelling charge housing 15 is arranged inside the igniter and separates a space of its own filled with propelling charge 2. In addition, the ignition resistor 8 surrounded by ignition material 7 is arranged inside this space. Since in the restraint case firstly the gas has to flow into the working space 41 in order to actuate the piston, a slightly delayed acceleration of the piston 40 results which, however, reduces the load exerted to all parts.

I claim:

1. A belt pretensioner comprising a piston, a cylinder with a radial opening and a pyrotechnical gas generator having a propelling charge arranged within said cylinder, said pretensioner further comprising an electrical igniter having an igniter housing of its own, said igniter and said cylinder with said propelling charge defining separate units to allow separate shipping of said units before final assembly of said units, said igniter housing containing pyrotechnical ignition material, an electrical ignition element and a cable end connected to said ignition element, said igniter housing being secured to said cylinder to radially extend therefrom, said igniter housing having an opening adjacent to said radial opening in said cylinder, wherein said propellant is ignitable through said openings in said igniter housing and in said cylinder.

2. The belt pretensioner as set forth in claim 1, wherein said propelling charge is ring shaped and wherein said cylinder has a wall.

3. The belt pretensioner as set forth in claim 1, wherein said igniter housing has a rearward opening in which said end of said cable is polled out.

4. The belt pretensioner as set forth in claim 1, wherein said igniter is releasably securable to said cylinder.

5. The belt pretensioner as set forth in claim 4, wherein a connector is provided having at least one part molded to said igniter housing, said connector defining a fastener means for attaching said igniter to said cylinder.

6. The belt pretensioner as set forth in claim 5, wherein said connector comprises a fastener ring molded on said igniter housing, said fastener ring being mountable on said cylinder.

7. The belt pretensioner as set forth in claim 1, wherein one of a sensor and a Switch is electrically connected to said cable, wherein at least one electrical plug contact connected to said cable is molded on said igniter housing, and wherein a mating connector latchable to said plug is connected with one of said sensor and said switch.

8. The belt pretensioner as set forth in claim 7, wherein said cable is configured as a multi-core cable, of which cores are branched off prior to said igniter housing to one of said sensor and said switch.

9. The belt pretensioner as set forth in claim 8, wherein connectors are attached at the end of said branched-off cores.

10. A belt pretensioner comprising:

a piston;

a cylinder having a radial opening;

a propelling charge arranged within said cylinder;

an electrical igniter for igniting said propelling charge releasably connected to said cylinder, said igniter having an igniter housing, said igniter housing containing pyrotechnical ignition material, an electrical ignition element and a cable end connected to said ignition element, said igniter housing extending radially from said cylinder, said igniter housing having an opening adjacent to said radial opening in said cylinder, said propelling charge being ignitable through said opening in said igniter housing and said radial opening in said cylinder upon ignition of said ignition material.

* * * * *